Nov. 18, 1952 — L. E. KISSINGER — 2,618,152
LEAKAGE TESTER
Filed Jan. 27, 1949 — 2 SHEETS—SHEET 1

Inventor
Lewis E. Kissinger
By
Attorney

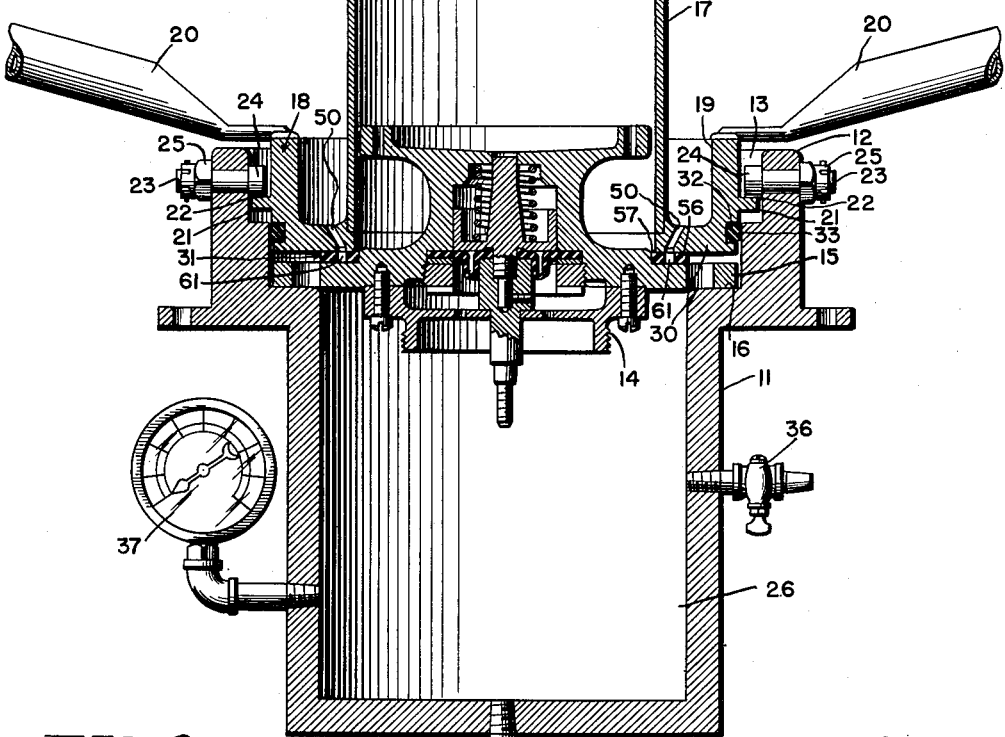

Patented Nov. 18, 1952

2,618,152

UNITED STATES PATENT OFFICE 2,618,152

LEAKAGE TESTER

Lewis E. Kissinger, Washington, D. C.

Application January 27, 1949, Serial No. 73,210

6 Claims. (Cl. 73—40)

(Granted under the act of March 3, 1883, as amended April 30, 1928; 370 O. G. 757)

This invention relates to a tester and more specifically, the invention pertains to a device for testing a hydrostatically operated mechanism for pressure tightness before installation thereof in an underwater weapon, such as a mine, depth charge, torpedo, or the like.

Furthermore, the invention is particularly adapted for quickly testing devices of the aforesaid types thereby to detect a leakage therein due to porosity of the castings, defective rubber diaphragms and improper assembly of the component parts thereof without employing water or any other wetting fluid in contact with the device under test during the testing operation.

Heretofore the method employed for testing hydrostatically operated devices of this character and the component parts thereof for pressure tightness has not proven entirely satisfactory for the reason that the test comprised immersing one side of the device under test in water or coating the device with a copious amount of soap solution and applying air under pressure to the other side thereof. Should the casting of the device under test have a leakage therein caused by an imperfection the fluid or soap solution would seep into the interior of the casting and render the mechanism therein inoperative or otherwise necessitate the complete overhauling and cleaning of the component parts thereof before the devices could be put in service.

The present invention provides a new and improved tester whereby a hydrostatically operated device may be tested without the use of water or other wetting fluid in contact therewith and in which means are provided for indicating the rate and volume of air leakage through the component parts of the device under test.

One of the objects of the present invention is the provision of a new and improved tester for testing the pressure tightness of a hydrostatically operated device without the use of water or other wetting agent in contact with the device.

Another object is to provide a new and improved tester adapted to detect and measure the rate and volume of air leakage occurring through the device under test due to improper construction or imperfections therein when air pressure is applied thereto.

Another object is to provide a new and improved air controlled device for testing the leakage of a hydrostatically operated device for use with an underwater weapon.

A further object is to provide a new and improved tester for quickly and accurately detecting the leakage of air occurring through the device under test and the rate of such leakage when the device is sealed within the tester and air under pressure is applied to one side thereof.

Other objects and many of the attendant advantages of this invention will be readily appreciated as the same becomes better understood by reference to the following detailed description when considered in connection with the accompanying drawings wherein:

Fig. 3 is a central longitudinal sectional view taken substantially on the line 3—3 of Fig. 1;

Fig. 4 is a fragmentary plan view of the sealing gasket employed with the present invention;

Fig. 5 is an enlarged sectional view taken on the line 5—5 of Fig. 4; and

Fig. 6 is an enlarged sectional view taken on the line 6—6 of Fig. 4.

Figure 1:
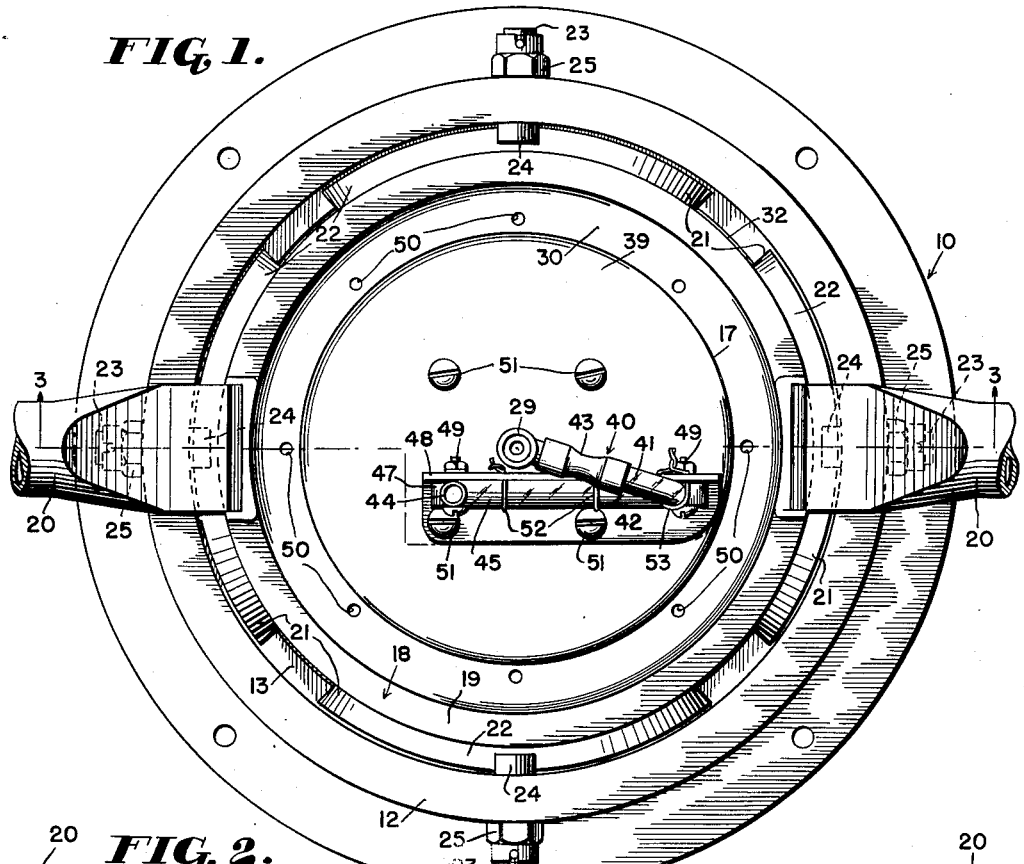
Fig. 1 is a plan view of the device of the present invention.

Referring now to the drawings and more particularly to Fig. 1 thereof the tester of the present invention is generally indicated by the reference character 10 and is especially adapted for testing castings and the hydrostatically operated mechanisms therein for pressure tightness prior to installing such devices in service in an ordnance weapon such, for example, as a mine, depth charge, torpedo, or the like.

As shown on Fig. 3, the tester comprises a lower container 11, having an enlarged circular wall 12 integrally formed on the upper end thereof and constituting a well 13 in which is disposed the device 14 to be tested for imperfections and known to those skilled in the art to which the invention relates as a clock starter mechanism, the flange 15 thereof being disposed on a shoulder 16 arranged within the aforesaid well 13.

An upper container 17, Fig. 3, has an enlarged head 18 formed thereon and constituting a circular upstanding flange 19 having a pair of oppositely disposed handles 20 secured thereto in any suitable manner, such for example, as by welding the parts together. By the aforesaid handle arrangement it will be understood that the container 17 may be rotated with respect to the container 11, the purpose of which will be more clearly apparent as the description proceeds. A plurality of spaced cam members 21 are integrally formed on the flange 19, each cam member being provided with a cam surface 22 arranged thereon.

Figure 2:
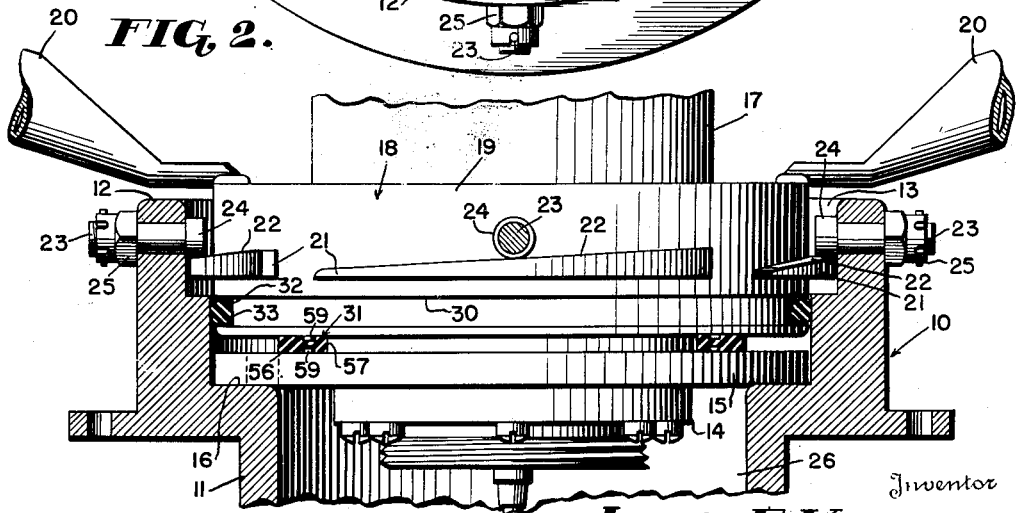
Fig. 2 is a fragmentary view partially in elevation and partially in section and showing the cam arrangement for sealing the device under test within a pair of separable containers.

Arranged about the member 12 and in spaced relation with respect to each other are a plurality of bolts 23, having heads 24 formed on one end thereof respectively and disposed within the well 13, the bolts being secured to the wall 12 in any suitable manner, preferably by nuts 25 threaded on the other end thereof and in abutting engagement with the outer surface of the wall 12, Fig. 2. From the foregoing description, together with the accompanying drawings, it will be understood that the heads 24 on bolts 23 are adapted to coact with the cam surfaces 22 in such a manner as to clamp and seal the containers 11 and 17 together and concurrently therewith seal the device to be tested therebetween thereby to provide a high pressure chamber 26 within container 11 in which the lower side of the device is disposed and a low pressure chamber 27 within the container 17 in which the upper side of the aforesaid device is disposed. The chamber 27 is in communication with the atmosphere as by vent pipe 29 secured to the upper end of the container 17 in any suitable manner such, for example, as threading the parts together and extending a predetermined amount thereabove, Fig. 3, the purpose of which will become more apparent as the description proceeds.

The high pressure chamber 26 is sealed with respect to the low pressure chamber by a gasket 31 composed of any material suitable for the purpose, such as rubber, or any of the synthetic varities thereof, the gasket being disposed between the member 18 and the flange 15 and maintained in sealing engagement therewith by the aforesaid bolt and cam arrangement which also maintains the flange in abutting engagement with the shoulder 16, Figs. 2 and 3, the chamber 26 being further sealed by an O ring 32 disposed within a groove 33 formed in the flange 19 and in engagement with the inner surface of the wall 12. It will be understood, however, that as the operator grasps the handles 20 and rotates the member 17 with respect to container 11, the gasket 31 is forced into sealing engagement with the flange 15 and the right angle portion 30 integrally formed on flange 19 in which is arranged a plurality of ports 50, the purpose of which will be more clearly apparent as the description proceeds. By the aforesaid sealing engagement the air under pressure admitted in the chamber 26 by way of inlet pipe 34 and controlled by a valve 35 therein is maintained within the chamber.

As shown on Fig. 3, the container 11 is provided with a relief valve 36 adapted to relieve the pressure within chamber 26 when desired, as, for example, when a test has been completed or when excess pressure has been admitted therein during a testing operation, the container also being provided with a pressure gauge 37 secured thereto and in communication with chamber 26 for observing the amount of pressure therein.

Arranged on the upper or end wall 38 of the container 17 is a plate 39 composed of any material suitable for the purpose such, for example, as "Bakelite" and having a gauge or manometer generally indicated by the reference character 40 mounted thereon. The gauge comprises a substantially C-shaped tube 41 composed of any transparent material suitable for the purpose such, for example, as glass, one end 42 thereof being secured to the pipe 29 by a flexible connection 43, the other end 44 being disposed vertically and at substantially a right angle with respect to an inclined portion 45 thereof and extending a predetermined amount thereabove. A quantity of light grade of lubrication oil 46, Fig. 3, is arranged in the lowermost portion 45 of the tube, the length of the oil globule being substantially ¼ of an inch. As shown most clearly on Fig. 3 the tube 41 rests on a member 47 secured to an L-shaped bracket or plate 48 as by screws or bolts 49, the bracket being secured to the plate 39 and end wall 38 of the container 17 as by screws 51 or the like. The tube 41 is secured to the plate 48 and the inclined portion 45 thereof is maintained in engagement with the member 47 in any suitable manner but preferably by a pair of spaced wires 52 secured to the plate 48 and looped about the member 47 and portion 45 of the tube 41, and by an additional wire 53 secured to the aforesaid plate and looped about the portion 54 of the tube.

The arrangement of the "Bakelite" plate 39 between the end wall 38 on container 17 and the manometer support 48 prevents the transfer of temperature changes from the container to the manometer caused by the operator's hand coming in contact therewith particularly when the vent pipe 29 is closed by the operator's finger during the testing operation. From the foregoing description and arrangement it will be understood that spurious temperature changes are thus prevented from effecting the manometer.

As shown more clearly on Fig. 4, the gasket 31 comprises a pair of annular sections 56 and 57 secured together by a plurality of spaced webs 58 of lesser thickness than the sections 56 and 57 thereby to provide an air leakage channel 59 on each side of the webs which is in communication with a plurality of spaced elongated openings 61 respectively, the opening being in communication with the ports 50, Figs. 1 and 2. By the foregoing construction and arrangement should air under pressure in chamber 26 leak past the section 56 of gasket 31 it will be directed to the ambient atmosphere by way of channels 59, openings 61, and ports 50 and thus the pressure resulting from such air leakage is prevented from entering chamber 27 and effecting the manometer reading during a testing operation.

It will be understood that the manometer indicates the volume of air leakage into the upper chamber and the time rate of such leakage should the device under test have any imperfections therein when the tester is in operation and a predetermined pressure has been supplied to the lower chamber.

In order for the test to be sufficiently sensitive for the purpose intended, it is necessary that the manometer operate on a pressure equivalent of a depth of about 0.007 inch of water. This is low enough such that the air in the upper chamber is not appreciably compressed to effect a slight movement of oil within the tube. The sensitivity of the manometer is accomplished by inclining the portion 45 of the tube substantially 0.031 inch per inch of the length thereof when the testing device is in a vertical position and by the arrangement of the aforesaid globule of oil in the lowermost portion of the tube, as shown on Fig. 3 when the vent 29 is open. Therefore, during testing operation, should oil within the portion 45 of the tube move a distance of one inch in 30 seconds it would indicate that the device under test has imperfections therein substantially equivalent to a water leak of one drop a day and thus by inspection of the rate of movement of the oil bubble this rate of leakage is determined and thus it could be determined whether the device was fit for service.

The operation of the device will now be described. Let it be assumed by way of example, that the device to be tested is clamped in the vertical position as shown on Fig. 3, and in sealed relation with respect to the aforesaid containers 11 and 17 thereby to provide the high and low pressure chambers 26 and 27 respectively. When this has been accomplished, the globule of oil will be in the position shown on Fig. 3. Air under pressure is now admitted into the chamber 26 such, for example, as 60 pounds per square inch by way of inlet pipe 34 as the valve 35 therein is operated to an open position. Air pressure is thus applied to one side of the device under test which is disposed within chamber 26. While the pressure within chamber 26 is building up, the vent 29 in the leakage chamber 27 remains open to the atmosphere, whereupon the air displaced by the flexing of the diaphragm or other movable parts of the mechanism under test will not affect the pressure within the chamber 27 or the operation of the manometer and the oil globule remains in this initial position shown. When the indicator on the pressure gauge 37 indicates the required amount of pressure within the chamber 26, the valve 35 is closed. When this has been accomplished and a predetermined period of time has elapsed, sufficient to allow the air pressure, diaphragm, and other parts of the mechanism to become stable, the vent 29 in communication with the chamber 27 is closed in any suitable manner such, for example, as by placing a finger thereover. From the foregoing description it will be understood that should the device under test have any leakage therein caused, for example, by porosity of the casting, faulty assembly, or a defective flexible diaphragm, the rate of leakage of air from the high pressure chamber 26 through such defect and into the low pressure chamber 27 will be readily detected by the rate of movement of the manometer fluid in response to an increase in the fluid within chamber 27 caused by the aforesaid air leakage and directed thereto by way of pipe 29, flexible connection 43, and thence to tube 41. As the finger is removed from vent 29 the oil globule returns to the initial position shown on Fig. 3. Valve 35 is closed, valve 36 is opened to relieve the pressure within chamber 26 and the device under test is removed from the tester.

In the event that the device under test did not leak when pressure was applied thereto from chamber 26, the oil globule 46 remains stationary in the lowermost position of the tube 41 as the vent 29 is closed.

Whereas in the embodiment of the invention illustrated the vent 29 is adapted to be closed by the operator's finger, obviously, if desired, a valve or other closing device may be employed for this purpose.

Briefly stated in summary, the foregoing invention contemplates the provision of a new and improved leakage tester for detecting the volume and time rate of leakage in hydrostatically operated mechanisms such, for example, as the types employed in a mine, depth charge, torpedo, or the like, without employing liquid or other wetting substance in contact with the mechanism under test.

For purposes of illustration, the invention has been described in connection with clock starter mechanism, but it is obviously not so limited, it being adapted for testing various hydrostatically operated mechanisms employed in ordnance weapons for pressure tightness.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. A device of the character disclosed for testing the leakage of a hydrostatically operated mechanism suitable for use with an ordnance weapon and comprising a pair of separable casings, means including a plurality of headed devices for securing said casings together in sealed relation and concurrently therewith sealing said mechanism therebetween, means including a valve secured to one of said casings for applying air at a predetermined fixed pressure to one side of said mechanism, normally open vent means for the other one of said casings, and means including a pressure responsive device secured to said other casing in communication therewith and operatively connected to said vent means for indicating the time rate and exact volume of minute air leakage in said mechanism as said vent means is closed.

2. A device of the character disclosed for testing the leakage of a hydrostatically operated mechanism suitable for use with an ordnance weapon and comprising a pair of upper and lower casings rotatable with respect to each other, a plurality of cam surfaces on said upper casing, a plurality of cam engaging devices on said lower casing constructed and arranged to coact with said cam surfaces for securing said casings together in sealed relation with respect to each other and with said mechanism as the upper casing is rotated to a sealed position, means for rotating said upper casing, means including a manually operated valve secured to the lower casing for maintaining air at a predetermined fixed pressure therein and applied to one side of the mechanism when the valve is opened, means including a pressure responsive device secured to the upper casing in communication therewith for indicating the time rate and volume of minute air leakage in the mechanism as said air under pressure in the lower casing is forced therethrough and into the upper casing, and means secured to said upper casing in communication therewith and operatively connected to said pressure responsive device for rendering the responsived device effective when the air in said lower casing has reached said predetermined fixed value of pressure.

3. A device of the character disclosed for testing the leakage of a hydrostatically operated mechanism suitable for use with an ordnance weapon and comprising a container having a pair of separable casings, means for securing and sealing said casings together and concurrently therewith sealing said mechanism between the casings thereby to provide a high pressure chamber on one side of the mechanism and a low pressure chamber on the other side thereof, means secured to one of the casings for maintaining air at a predetermined fixed pressure in said high pressure chamber and applied to said one side of the mechanism, a normally open vent for said low pressure chamber, and means including a pressure responsive device secured to the other one of said casings and in communication with said low pressure chamber for indicating the volume of minute air leakage in said mechanism as the vent is closed.

4. A device of the character disclosed for testing the leakage of a hydrostatic pressure operated mechanism suitable for use with an ordnance weapon and comprising a container having a pair of separable upper and lower casings, means for securing and sealing said casings together and concurrently therewith sealing said mechanism therebetween thereby to provide a high pressure chamber on one side and a low pressure chamber on the other side thereof, means including a valve on said lower casing for maintaining air at a predetermined fixed pressure in said high pressure chamber sufficient to operate said mechanism, a normally open vent secured to said upper casing and in communication with said low pressure chamber for preventing a change in the pressure therein while the mechanism is operating in response to said fixed pressure, and means operatively connected to said vent in communication with the low pressure chamber for indicating the rate and volume of minute air leakage in the mechanism when said vent is closed.

5. A device of the character disclosed for testing the leakage of a mechanism comprising a casting having the flexibile pressure responsive element therein, said device comprising a pair of upper and lower casings, means including a plurality of cams on one of said casings for securing and sealing said casings together and concurrently therewith sealing said casting therebetween thereby to provide a high pressure chamber on one side and a low pressure chamber on the other side of said casting, means including a valve on said lower casing for maintaining air at a predetermined fixed pressure in said high pressure chamber and applied to said one side of the casting, a pressure responsive device secured to the upper casing and operatively connected to the low pressure chamber, and a normally open vent operatively connected to said pressure responsive device and in communication with said low pressure chamber for preventing operation thereof in response to the air displaced by the flexing of said flexible element as the pressure within the high pressure chamber is building up to said predetermined fixed value, said pressure responsive device being constructed and arranged to indicate the rate and volume of minute air leakage forced through said mechanism and into the low pressure chamber when said vent is closed.

6. A device of the character disclosed for testing the minute leakage of a hydrostatic pressure operated mechanism and comprising a pair of containers, means for detachably securing said containers together in sealed relation and concurrently therewith sealing said mechanism therebetween thereby to form a high pressure chamber on one side of the mechanism and a low pressure chamber on the opposite side of the mechanism, means for applying air at a predetermined fixed pressure to said high pressure chamber, a normally open duct in communication with said low pressure chamber and the ambient air, pressure responsive means in communication with the low pressure chamber and operatively connected to said duct, and an indicating element arranged within said responsive means and movable from an initial position variably in accordance with the pressure differential applied thereto as the duct is closed thereby to indicate the leakage in said mechanism as said predetermined fixed pressure is applied to the high pressure chamber.

LEWIS E. KISSINGER.

REFERENCES CITED

The following references are of record in the file of this patent:

UNITED STATES PATENTS

| Number | Name | Date |
|---|---|---|
| 669,529 | Kennedy | Mar. 12, 1901 |
| 1,145,676 | Ellison | July 6, 1915 |
| 1,361,142 | Cook | Dec. 7, 1920 |
| 1,599,964 | Haven | Sept. 14, 1926 |
| 2,417,988 | Mooney | Mar. 25, 1947 |

OTHER REFERENCES

Publication "Leakage Tester" U. S. Naval Ordnance Lab. Aug. 27, 1948, four pages.